United States Patent [19]

Shimada

[11] Patent Number: 5,327,293
[45] Date of Patent: Jul. 5, 1994

[54] REFLECTION MIRROR APPARATUS
[75] Inventor: Mizuho Shimada, Yokohama, Japan
[73] Assignee: Equestrian Co., Ltd., Tokyo, Japan
[21] Appl. No.: 980,875
[22] Filed: Nov. 24, 1992
[51] Int. Cl.⁵ .................... G02B 7/195; G02B 5/08
[52] U.S. Cl. .................... 359/845; 359/871; 359/869; 359/867; 359/853; 126/599; 126/699; 362/373; 362/345; 362/346
[58] Field of Search ........... 359/850, 851, 853, 867, 359/868, 869, 871, 845; 362/373, 345, 346; 126/599, 684, 696; 34/4

[56] References Cited

U.S. PATENT DOCUMENTS

| | | | |
|---|---|---|---|
| 4,177,502 | 12/1979 | Hiscock | 362/345 |
| 4,235,224 | 11/1980 | Yarwood et al. | 126/684 |
| 4,312,329 | 1/1982 | Carver et al. | 359/852 |
| 4,423,719 | 1/1984 | Hutchison | 359/852 |
| 4,734,574 | 3/1988 | Tanaka | 359/851 |
| 4,964,713 | 10/1990 | Goetzberger | 359/867 |
| 5,138,541 | 8/1992 | Kano | 362/345 |

Primary Examiner—Loha Ben
Assistant Examiner—Thomas Robbins
Attorney, Agent, or Firm—Lowe, Price, LeBlanc & Becker

[57] ABSTRACT

The reflection mirror apparatus of this invention, which can be applied to light projector, sterilizing lamp and development device, improves the light reflection precision and the light collecting performance, making it possible to clearly focus the reflected on an object of interest. The reflection mirror apparatus consists of a reflection mirror body made up of two or more reflection mirror bases, and plate-like reflection mirror auxiliary members. The reflection mirror base body and the reflection mirror auxiliary members can be assembled and disassembled by means of screws to a desired size.

3 Claims, 2 Drawing Sheets

REFLECTION MIRROR APPARATUS

BACKGROUND OF THE INVENTION

1. Field of the Invention

The present invention relates to a reflection mirror apparatus incorporated in such equipment as a light projector, sterilizing lamp, and developing device, and more particularly to a reflection mirror apparatus which is inexpensive and has improved illumination precision and light focusing performance.

2. Description of the Prior Art

Conventional reflection mirror apparatuses of this kind are made by using a strong cutting drill to cut a metal into a desired shape and subjecting the cut metal to buffing. There is an expensive manufacturing method, which applies resin to the polished aluminum or aluminum alloy, evaporates a high-purity aluminum over the surface of the resin, and then coats a protective glassy film over the aluminum-deposited surface. There are also inexpensive reflection mirrors, among them a mirror made by pressing a rolled metal sheet and one made of synthetic resin. However, no reflection mirror apparatuses are available which have a capability of focusing light on an object effectively and can be manufactured with low cost.

There are various kinds of machining in making the reflection mirror apparatus. In reflection mirror apparatuses, which are manufactured by cutting and polishing a metal, the larger the size of the apparatus, the higher the material cost becomes and the coarser the cut edges and polished surfaces will be. Such cutting and polishing work makes the surface treatment of the reflection mirror uneven, significantly deteriorating the illumination precision.

In the reflection mirror apparatuses, which are made by pressing a rolled metal, although they are less expensive than those made by cutting a metal, they are likely to produce strain in the curved portion of the mirror. This strain tends to increase as the size of the reflection mirror increases, which in turn makes the surface uneven when subjected to plating and other surface treatment, significantly degrading the light reflection performance.

SUMMARY OF THE INVENTION

It is therefore an object of this invention to provide a reflection mirror apparatus which has improved illumination precision and light collecting performance so that light can be effectively focused on an object of interest.

Another object of the invention is to provide a reflection mirror apparatus, in which an auxiliary reflection mirror section B is formed in the form of an enclosure by means of a plurality of plates and removably mounted to the reflection mirror member in order to make the apparatus less expensive.

A further object of the invention is to provide a reflection mirror apparatus, which can be assembled and disassembled by means of screws to a desired size.

A further object of the invention is to provide a reflection mirror apparatus, in which reflection mirror members are formed small so as to facilitate cutting and ensure uniform plating over the concave surface.

BRIEF DESCRIPTION OF THE DRAWINGS

The drawings show one embodiment of the reflection mirror apparatus according to this invention.

DETAILED DESCRIPTION OF PREFERRED EMBODIMENT

Now by referring the to accompanying drawings, one embodiment of the reflection mirror apparatus M according to this invention is described in detail. The reflection mirror apparatus M consists of a reflection mirror base body A and an auxiliary reflection mirror section B. The reflection mirror base body A has its inner wall surface curved and plate-like reflection mirror auxiliary members $B_1$, $B_2$, ... extend from under the reflection mirror base body A to define the auxiliary reflection mirror section B in the form of an enclosure and have their inner wall surfaces formed with a light reflection layer. The reflection mirror base body A and the auxiliary reflection mirror section B may be connected together by screws 10 or partly by spot-welding (not shown) through a frame 2 that is secured to the reflection mirror base body A by suitable means. Thus, the frame 2 has an underside A' when connection is made. They may also be joined by a fixing means such as clip (not shown) or by directly fixing the auxiliary reflection mirror section B to the reflection mirror base body A. Joining them in this way increases the illumination precision, making it possible for the reflected light from the auxiliar reflection mirrory section B to be focused on a desired portion of the object of interest (not shown).

Figure 1:
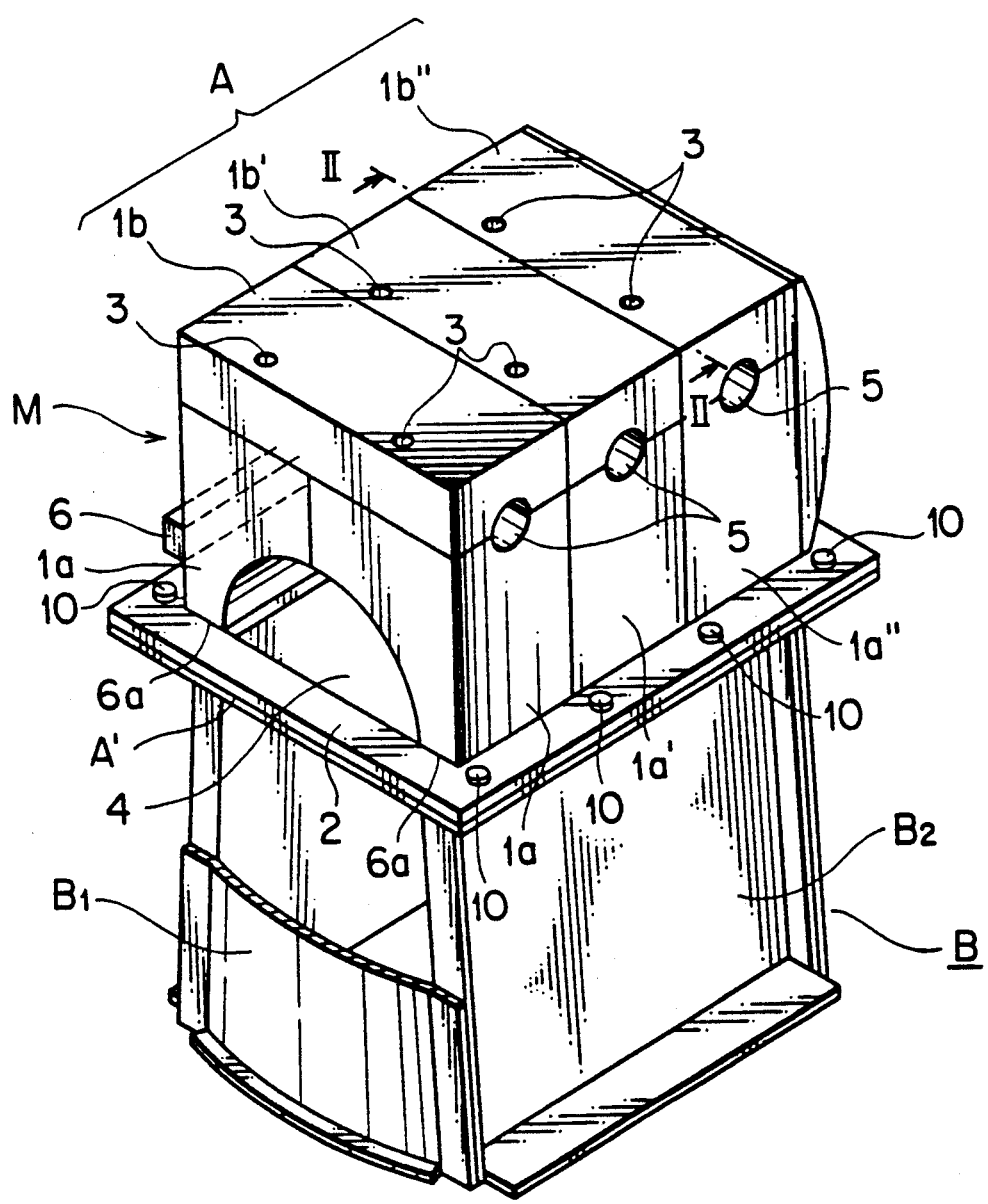
FIG. 1 is a perspective view of a partly cutaway reflection mirror auxiliary member in the invention.
Figure 2:
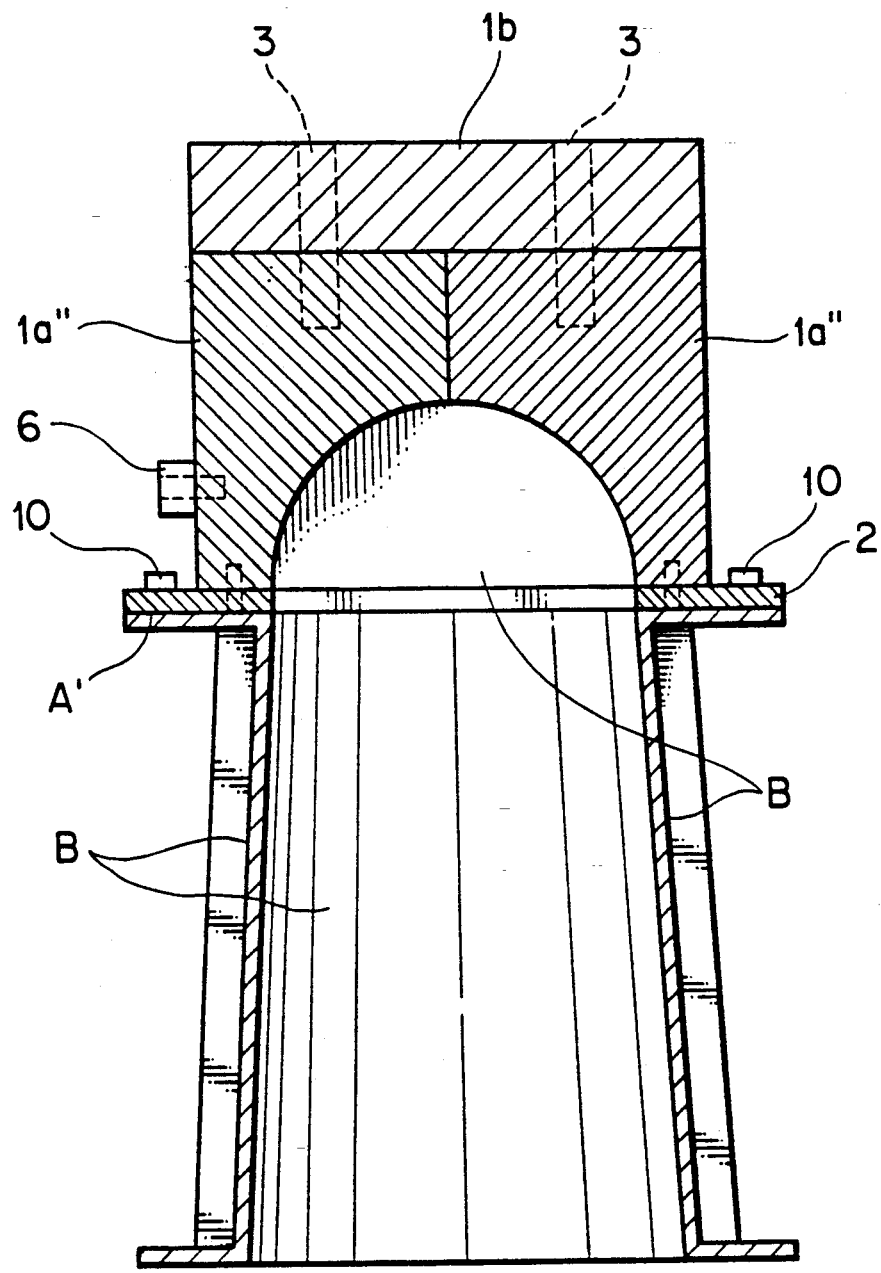
FIG. 2 is a cross section taken along the line II—II of FIG. 1.

In the reflection mirror apparatus M of this invention, to improve the machining accuracy a plurality of reflection mirror bases $1a$, $1a'$, $1a''$ may be assembled into one block, as shown in FIG. 1, to form the reflection mirror base body A. This will be described in further detail. The reflection mirror base body A consists of a frame 2 which has an opening 4; a plurality of reflection mirror bases $1a$, $1a'$, $1a''$ arranged side by side whose legs $6a$ are secured to the frame 2; fixing members $1b$, $1b'$, $1b''$ that fix together pairs of reflection mirror bases $1a$, $1a$, $1a'$, $1a'$, $1a''$, $1a''$; and a support rod 6 that aligns and supports the reflection mirror bases $1a$, $1a'$, $1a''$. The reflection mirror base body A has its inner wall surface formed with a reflection layer.

The reflection mirror bases $1a$, $1a'$, $1a''$ may be made of metal material, glass or resin, or made of a combination of these materials. The selection of material should consider various properties of the candidate material, such as heat resistance, ultraviolet resistance, resistance against discoloration, deformation and rusting, wear resistance, hardness, softness, machinability, and weight. Of the metal materials, brass and aluminum or aluminum alloy are used for the base of the reflection mirror. Because of its good machinability and low cost, aluminum is the most likely candidate material.

The reflection mirror bases $1a$, $1a'$, $1a''$ each have a curved inner wall surface and, when the paired mating bases are combined together, form a semicircular surface. The legs $6a$ of the reflection mirror bases $1a$, $1a'$, $1a''$ are fastened by screws to the frame 2, which is formed with the opening 4. The fixing members $1b$, $1b'$, $1b''$ are attached to the upper surfaces of the reflection mirror bases 1a, 1a', 1a" and screws (not shown) are screwed into the threaded holes 3 in the fixing members 1b, 1b', 1b" to securely fix the reflection bases 1a, 1a', 1a".

The support rod 6 is attached to the side surfaces of the reflection mirror bases 1a, 1a', 1a" and secured to the bases by screws not shown to align and hold the bases in position.

While in this embodiment the reflection mirror base body A is made up of a plurality of bases, it may be formed of a single elongate member as long as it achieves a constant desired reflection.

Designated 5 is a hole formed in the junction between the reflection mirror bases 1a, 1a', 1a" and the fixing members 1b, 1b', 1b", through which a water pipe is inserted to cool the reflection mirror base body A when a high-temperature device is used.

The reflection layer on the inner wall surfaces of the reflection mirror bases 1a, 1a', 1a" is applied with a thick nickel plating and, over this nickel plating, with a glossy plating of, say, chrome, gold or silver. For example, the chrome used as the glossy finish plating will prevent formation of pin holes or cracks. Small rough areas that remain on the inner wall surfaces of the reflection mirror bases 1a, 1a', 1a" can be smoothed out by the nickel plating, thus simplifying the laborious process of polishing work.

If the reflection mirror bases 1a, 1a', 1a" are made of aluminum, the bases are light and easily cut and drawn but requires mechanical polishing or buffing to smooth out remaining small rough areas on the inner wall surfaces, which form a reflection surface. Hence, in this case the nickel plating is effectively used.

What is claimed is:

1. A reflection mirror apparatus having light reflection precision including:
    a reflection mirror base body comprising a plurality of reflection mirror elements which define a three-dimensional rectangular base having a concave wall surface formed in one face thereof, said concave wall surface having a light reflection layer formed thereon; and
    an auxiliary reflection mirror section extending from said face of said three-dimensional rectangular base having said concave wall surface formed therein, said auxiliary reflection mirror section comprising two pairs of opposed plates which form an open ended rectangular enclosure which extends from said face of said three-dimensional rectangular base having said concave wall surface formed therein, each of said plates being substantially parallel to one another and having a light reflection layer applied to inner surfaces thereof.

2. A reflection mirror apparatus as claimed in claim 1, wherein said reflection mirror base body and said auxiliary reflection mirror section are attached together at connections thereof with fixing means.

3. A reflection mirror apparatus as claimed in claim 2, wherein said connections of the reflection mirror base body and said auxiliary reflection mirror section are fastened together by screws with a frame interposed therebetween.

* * * * *